UNITED STATES PATENT OFFICE.

EMILIO GUI, OF ROME, ITALY, ASSIGNOR TO THE FIRM OF ING. BARZANO' & ZANARDO, OF ROME, ITALY.

PROCESS OF MAKING CALCIUM CYANAMID BY THE ACTION OF NITROGEN ON CALCIUM CARBID.

1,164,087. Specification of Letters Patent. Patented Dec. 14, 1915.

No Drawing. Original application filed April 17, 1913, Serial No. 761,719. Divided and this application filed June 4, 1914. Serial No. 842,863.

*To all whom it may concern:*

Be it known that I, EMILIO GUI, a subject of the King of Italy, residing at Rome, Italy, gentleman, (whose post-office address is Via Lucrezio Caro No. 67,) have invented certain new and useful Improvements in Processes of Making Calcium Cyanamid by the Action of Nitrogen on Calcium Carbid, of which the following is a specification.

This invention relates to processes of making calcium cyanamid from calcium carbid and has for its object to produce such calcium cyanamid, in a manner to be more fully disclosed below.

This application is a division of my copending application Number 761719, entitled "Improvements in manufacturing calcium cyanamid by the action of nitrogen on calcium carbid" and filed April 17th 1913.

It is known that calcium cyanamid is prepared by reaction, obtained in suitable condition, of nitrogen on calcium carbid, and that the product of this reaction is a compact mass which must be broken up and pulverized for being marketable. It is also known that the reaction between nitrogen and calcium carbid is very exothermic. It has been found by a series of experiments that when heating a pulverized calcium cyanamid the latter does not form again a compact mass even if the temperature to which it is heated is higher than the temperature at which nitrogen enters into reaction with the carbid. It has also been found that when mixing with the pulverized calcium cyanamid very small quantities of pulverized calcium carbid and heating this mixture sufficiently in the presence of nitrogen, the latter reacts very well even on the particles of carbid distributed in the cyanamid already formed; in the latter case, however, if the quantity of carbid is small enough relatively to the quantities of cyanamid in which the said carbid is distributed, the mixture of cyanamid already formed, and also the newly formed cyanamid do not form a compact mass, but, on the contrary the said mixture remains in a condition of powder or friable particles. On this notion a new process for manufacturing calcium cyanamid has been based by using a reaction chamber which is thermically insulated and subjected to a special movement. After the temperature of the said chamber has been brought up to a degree higher than that at which the nitrogen enters into reaction with carbid, a current of nitrogen is admitted thereto and a mixture of carbid and pulverized cyanamid prepared in such proportion that the product of azotation does not coagulate into a compact mass. After the reaction is effected a certain quantity of its contents is taken from the reaction chamber, which is found to be in a condition of powder and friable particles. Thereafter a portion of the said contents is replaced into the reaction chamber after having been mixed, while still red hot, with the fresh charge of carbid, whereupon the portion which had remained in the oven is taken out, and so forth. Obviously only a quantity of cyanamid corresponding to the charge of carbid may be extracted, and the remainder is left in the reaction chamber in which the mixture of carbid and cyanamid is effected.

Owing to the fact that the reaction chamber is thermically insulated as much as possible, and the reaction between the nitrogen and carbid is very exothermic, when the reaction has begun in any way, it may proceed indefinitely by the heat produced by the reaction alone or with the addition of little outside heat. In fact, the calories which during one phase of the reaction process are absorbed by the walls of the reaction chamber and by the materials contained in the latter, are partially given back in a subsequent phase to the carbid of the fresh charge by the said walls and material, and thereby the carbid of the fresh charge is brought to the temperature necessary for the reaction. Consequently an exchange of thermical energy takes place which forms the main feature of the present process, and a perfect utilization of the said energy is obtained.

As has been said, the reaction chamber is subjected to a movement, and so are, of course, the materials contained therein. This movement, however, must be such that the said materials instead of being simply pushed from one end to the other of the chamber are, on the contrary, mixed rapidly, intimately and uniformly together. The heat stored in the reaction chamber is consequently distributed uniformly in all the parts of the oven, and the nitrification of carbid is effected more rapidly and completely than in the case of the carbid remaining at rest or being subjected to a simple falling or shifting movement. It is, at last, to be noted that once the normal operation of the oven has been obtained, its interior temperature oscillates between extreme limits which are not too wide apart, the maximum limit of which is materially inferior to that which must be reached in other known processes. All damages caused by too high temperatures are thereby eliminated.

According to the degree of discontinuity with which the above described process is effected, and according to the quality of the raw carbid used (and consequently the number of calories developed by its weight), it may be necessary to supply the reaction chamber with heat not produced by the reaction itself, not only at the beginning for starting manufacturing, but also afterward in order to revivify the same.

Instead of calcium cyanamid one may mix with the carbid (in the relatively very high proportion necessary for carrying out the present process) one or more substances in a powdered condition which do not coagulate at the temperature of the reaction chamber, such substances being for instance carbon, lime, leucite and other silicates of this kind. As it is possible to make the said substitution, it is also possible to begin the manufacture of calcium cyanamid by the present process without starting with cyanamid prepared by a different process.

The above described process may be also effected if the powdered carbid outside of the reaction chamber, and without being in contact with the nitrogen, reaches so high a temperature that a partial scission of its molecules takes place. The said process is also effected if instead of pure nitrogen the same is used mixed with other gases which are indifferent or nearly indifferent to carbid and cyanamid in the conditions of operation obtained in the process, which latter is also effected if to the calcium carbid well known quantities of reaction exciting or accelerating substances are added, such as for instance cyanids, ferrocyanids or ferricyanids, halogenated oxids or salts of alkali and alkaline-earth metals, earth metals, and so forth. The said exciting or accelerating substances, however, may be added in very small proportions in the present process as in all other processes, because, owing to the movement and subdivision of the materials contained in the reaction chamber, the said substances may subsequently be in contact with ever fresh carbid particles.

The red hot cyanamid put again in the cycle of manufacture, must be, of course, protected, before being put in, against the action of atmospheric influences and losses of heat.

Having now fully described my said invention and the manner in which the same is to be performed, what I claim and desire to secure by Letters Patent is:

1. A process of preparing calcium cyanamid, said process consisting in mixing a small portion of calcium carbid with a large portion of red hot calcium cyanamid; and passing nitrogen thereover whereby calcium cyanamid and heat are produced.

2. A process of preparing calcium cyanamid said process consisting in mixing a small portion of calcium carbid with a large portion of red hot material containing calcium cyanamid; and passing nitrogen thereover whereby calcium cyanamid and heat are produced.

3. A process of preparing calcium cyanamid, said process consisting in mixing a small portion of calcium carbid with a large portion of red hot material containing calcium cyanamid; and passing nitrogen thereover whereby calcium cyanamid and heat are produced, the proportion of carbid to said material being so small that the reaction product does not form a compact mass.

4. A process of preparing calcium cyanamid, said process consisting in mixing a small portion of calcium carbid with a large portion of red hot other material in the form of powder; and passing nitrogen thereover.

5. A process for preparing calcium cyanamid, said process consisting in mixing a small portion of calcium carbid with a large portion of red hot material containing calcium cyanamid; passing nitrogen thereover whereby calcium cyanamid and heat are produced; adding additional small quantities of carbid; and extracting the formed cyanamid.

6. A process of preparing calcium cyanamid, said process consisting in mixing a small portion of calcium carbid with a large portion of red hot other material in powdered condition and which does not fuse at the temperature used; and passing nitrogen thereover.

In testimony whereof I have signed my name to this specification in presence of two subscribing witnesses.

EMILIO GUI.

Witnesses:
 DUILID NARDONI,
 MINO VIVENSY.